US009298427B2

(12) United States Patent
Liu et al.

(10) Patent No.: US 9,298,427 B2
(45) Date of Patent: Mar. 29, 2016

(54) CREATING INFERRED SYMBOLS FROM CODE USAGE

(75) Inventors: Karen Liu, Bellevue, WA (US); Kevin Pilch-Bisson, Snohomish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 949 days.

(21) Appl. No.: 12/652,758

(22) Filed: Jan. 6, 2010

(65) Prior Publication Data

US 2011/0167404 A1   Jul. 7, 2011

(51) Int. Cl.
*G06F 9/44* (2006.01)
*G06F 9/45* (2006.01)
*G06F 3/00* (2006.01)
*G06F 11/36* (2006.01)

(52) U.S. Cl.
CPC .. *G06F 8/33* (2013.01); *G06F 8/34* (2013.01); *G06F 8/41* (2013.01); *G06F 8/437* (2013.01); *G06F 8/75* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 6,094,529 A * | 7/2000 | Jeffries et al. | 717/110 |
| 6,618,824 B1 * | 9/2003 | Hastings | 714/35 |
| 6,684,388 B1 * | 1/2004 | Gupta et al. | 717/136 |
| 7,043,720 B2 | 5/2006 | Kuzmin | |
| 7,080,365 B2 | 7/2006 | Broughton et al. | 717/146 |
| 7,165,238 B2 | 1/2007 | Simonyi | 717/113 |
| 7,730,448 B2 * | 6/2010 | Meijer et al. | 717/106 |
| 7,958,493 B2 * | 6/2011 | Lindsey et al. | 717/117 |
| 2004/0230951 A1 | 11/2004 | Scandura | 717/120 |
| 2005/0223363 A1 * | 10/2005 | Black-Ziegelbein et al. | 717/127 |
| 2006/0004528 A1 | 1/2006 | Uehara et al. | 702/20 |
| 2006/0026559 A1 | 2/2006 | Gunturi et al. | |
| 2006/0142995 A1 | 6/2006 | Knight et al. | 704/9 |

(Continued)

FOREIGN PATENT DOCUMENTS

| | | |
|---|---|---|
| CN | 101657795 A | 2/2010 |
| CN | 101799760 A | 8/2010 |
| JP | 2005038212 A * | 2/2005 |

OTHER PUBLICATIONS

'Pluggable, Iterative Type Checking for Dynamic Programming Languages' by Tristan Allwood, copyright 2006.*

(Continued)

*Primary Examiner* — Steven Snyder
(74) *Attorney, Agent, or Firm* — Kevin Sullivan; Kate Drakos; Micky Minhas

(57) ABSTRACT

When writing code, data structures that include inferred symbols are created based on usage of undefined symbols. As the user continues writing code, code model can be updated to represent updated information based on a learning model. Data structures including inferred symbols can be used by software development tools to provide developer help for symbols that are not yet created or are not yet bound. Inferred symbols can be visually distinguishable making the appearance of the inferred symbol information differ from actual symbol information. The appearance of information based on inferred symbols can be included within tools by activating a particular mode in a programming environment. Conversion of the inferred symbol to a real symbol may trigger the automatic compiler-generation of additional source code by a background compiler. Inferred symbols may be converted to actual symbols by activation of an option to make an inferred symbol a real symbol.

20 Claims, 5 Drawing Sheets

(56) References Cited

U.S. PATENT DOCUMENTS

| | | | |
|---|---|---|---|
| 2006/0277525 A1 | 12/2006 | Najmabadi et al. | |
| 2007/0038978 A1* | 2/2007 | Meijer et al. | 717/106 |
| 2007/0044066 A1* | 2/2007 | Meijer et al. | 717/100 |
| 2007/0055978 A1* | 3/2007 | Meijer et al. | 719/331 |
| 2007/0094650 A1* | 4/2007 | Klein et al. | 717/151 |
| 2007/0234288 A1* | 10/2007 | Lindsey et al. | 717/117 |
| 2007/0277163 A1 | 11/2007 | Avresky | 717/140 |
| 2008/0022264 A1 | 1/2008 | Macklem et al. | 717/136 |
| 2008/0141230 A1 | 6/2008 | Rowlett et al. | 717/143 |
| 2008/0313604 A1 | 12/2008 | Cowtan | |
| 2009/0172650 A1 | 7/2009 | Spurlin | |
| 2010/0050101 A1* | 2/2010 | Baik et al. | 715/764 |
| 2010/0235730 A1 | 9/2010 | Campbell et al. | 715/256 |
| 2010/0269096 A1* | 10/2010 | Araya et al. | 717/113 |
| 2010/0325618 A1* | 12/2010 | Song et al. | 717/143 |
| 2011/0055815 A1* | 3/2011 | Squillace | 717/125 |
| 2011/0258593 A1* | 10/2011 | Ng et al. | 717/106 |
| 2011/0271250 A1* | 11/2011 | Park et al. | 717/113 |
| 2011/0271258 A1* | 11/2011 | Park et al. | 717/127 |
| 2011/0314459 A1* | 12/2011 | Husbands | 717/151 |
| 2014/0282384 A1* | 9/2014 | Pamer | 717/113 |

OTHER PUBLICATIONS

'Starkiller: A Static Type Inferencer and Compiler for Python' by Michael Salib, copyright Massachusetts Institute of Technology, 2004.*

Wikipedia's article on 'Structure Editor' archived on Aug. 4, 2008.*

'Programming with Ghosts' by Oscar Callaú and Éric Tanter, Published by the IEEE Computer Society, 2013.*

'Incremental Type-Checking for Type-Reflective Metaprograms' by Weiyu Miao Jeremy Siek, Copyright 2010 ACM.*

'Mixing Type Checking and Symbolic Execution' by Khoo Yit Phang et al., Copyright 2010 ACM.*

'Gradual Typing with Unification-based Inference' by Jeremy G. Siek and Manish Vachharajani, Copyright 2008 ACM.*

Notification of Transmittal of the International Search Report and the Written Opinion of the International Searching Authority mailed Aug. 30, 2011.

Written Opinion of the International Searching Authority mailed Aug. 30, 2011.

"XIDEK—Extensible Interpreter Development Kit—Reference Documentation Knowledge", Retrieved at, <<http://www.parsifalsoft.com/examples/xidek/xidek/doc/astci.htm>>, Nov. 19, 2007, pp. 7.

Campbell, et al., "Language-Independent Interactive Data Visualization", Retrieved at, <<http://delivery.acm.org/10.1145/620000/611972/p215-campbell.pdf?key1=611972&key2=6066327521&coll=GUIDE&dl=GUIDE&CFID=60953625&CFTOKEN=65966104>>, Proceedings of the 34th SIGCSE technical symposium on Computer science education, Feb. 19-23, 2003, pp. 215-219.

Tsay, et al., "A Code Generation Framework for Java Component-Based Designs", Retrieved at, <<http://delivery.acm.org/10.1145/360000/354884/p18-tsay.pdf?key1=354884&key2=6076327521&coll=GUIDE&dl=GUIDE&CFID=59647617&CFTOKEN=36290178>>, International Conference on Compilers, Architecture and Synthesis for Embedded Systems Proceedings of the 2000 international conference on Compilers, architecture, and synthesis for embedded systems, Nov. 17-19, 2000, pp. 18-25.

Franz, Michael, "Adaptive Compression of Syntax Trees and Iterative Dynamic Code Optimization: Two Basic Technologies for Mobile Object Systems", Retrieved at, <<http://www.springerlink.com/content/p17815660876m2t4/fulltext.pdf>>, Selected Presentations and Invited Papers Second International Workshop on Mobile Object Systems—Towards the Programmable Internet, Jul. 8-9, 1996, pp. 263-276.

"Chinese Office Action", Mail Date: May 6, 2014, Application No. 201080060704.8, Filed Date: Dec. 31, 2010, pp. 6.

"Chinese Office Action", Mail Date: Jan. 13, 2014, Application No. 201080060704.8, Filed date: Dec. 31, 2010, pp. 13.

"Chinese First Office Action", Mail Date: Jan. 10, 2014, Application No. 201110436176.8, Filed date: Dec. 22, 2011, pp. 15.

"Chinese Office Action", Mail Date: Mar. 13, 2014, Application No. 201080060704.8, Filed date: Dec. 31, 2010, pp. 6.

"Search Report Issued in European Patent Application No. 10842770.9", Mailed Date: Jul. 8, 2014, 10 Pages.

Callau, et al., "Programming with Ghosts", In IEEE Software, vol. 30, Issue 1, Jan. 2013, pp. 74-80.

Freeman, et al., "Mock Roles, not Objects", In Companion to the 19th Annual ACM SIGPLAN Conference on Object-Oriented Programming Systems, Languages, and Applications, Oct. 23, 2004, pp. 236-246.

* cited by examiner

CREATING INFERRED SYMBOLS FROM CODE USAGE

BACKGROUND

A dynamic programming language performs behaviors at run time that other (static programming) languages typically perform during compilation, if at all. Behaviors performed at runtime by dynamic languages include extending the program by adding new code, by creating objects and definitions, by modifying the type system during program execution and so on.

A dynamic programming language is typically dynamically typed, meaning that the type checking is performed at runtime. In dynamic typing, types are associated with values resulting from execution of the program. Dynamically typed languages include Clojure, Groovy, JavaScript, Lisp, Objective-C, PHP, Prolog, Python, Ruby, Smalltalk, late-binding in Visual Basic, IronPython and IronRuby. Dynamic typing is less rigid than static typing but can result in a greater potential for execution errors (e.g., an error results because a value for a variable has a type that is not allowed). Dynamically typed language systems typically make fewer compile time checks on the source code. Runtime checks potentially can be more sophisticated because they can use dynamic (runtime) information in addition to information that was present during compilation and is still available at runtime. Runtime checks assert that conditions hold in a particular execution of the program and are repeated for each execution of the program.

Binding selects which actual operation to use when a syntactic operation is applied in source code. Binding can occur either at compile time, in which case it is called "static binding", or can occur dynamically at runtime, which is called "dynamic binding". Dynamic binding postpones the resolving of undefined variables until a program is run. Dynamic binding is different from static binding because its result—the meaning assigned to an operation, for example—depends on the runtime types of the actual values it operates on instead of on the compile time types of the variables in the source code. Typically, statically typed programming languages perform static binding and dynamically typed programming languages perform dynamic binding. However, it is possible to have a hybrid of the two where a static language contains dynamic binding (such as C#4.0 with the dynamic language feature) and vice versa.

Test-driven development refers to an iterative software development technique in which a developer first writes a test case that validates a desired improvement or new function, then the developer produces the code that causes the test to pass, followed by refactoring the code base to account for any new system requirements. For example, code that includes the logic that manipulates objects may be written before the code that defines the objects is written. Another way of saying this is: consuming (consumption) code is written before the objects that are consumed are written.

SUMMARY

Dynamic programming techniques and test-driven development have at least one mutual challenge. In both cases, because the underlying consumed code has not yet been created, tools that rely on the underlying code being available cannot aid in the development process by for example, showing possible choices for auto-completion as the user is typing code in a source code editor. In accordance with aspects of the subject matter disclosed herein, data structures such as syntax trees or semantic trees that include inferred nodes and/or symbol tables that include inferred symbols are created, based on a symbol's usage (or potential use) throughout the code. Inferred nodes and/or inferred symbols may be generated via a learning algorithm. Tools can use the syntax trees, etc. thusly created to provide information on symbols that are not yet created or are not yet bound, for use in dynamic programming and test-driven development.

A data structure representing source code can be generated by a background compiler during interactive program development. One or more symbols can be added to the data structure based on source code entered in a source code editor, where the symbol is inferred from the source code based on usage of the symbol without prior definition of the symbol. The inferred symbol may be created based on application of a set of rules to an undefined symbol. In response to receiving an indication from a user to do so, an inferred symbol can be converted to a real symbol. Conversion of an inferred symbol to a real symbol can be triggered by an action by the developer to automatically generate the source code based on the inferred symbol. The automatically-added source code will comprise a definition of the undefined symbol. Information associated with the inferred symbol can be displayed in software development tools in response to activation of an option in the programming environment to enter a "suggestion mode".

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
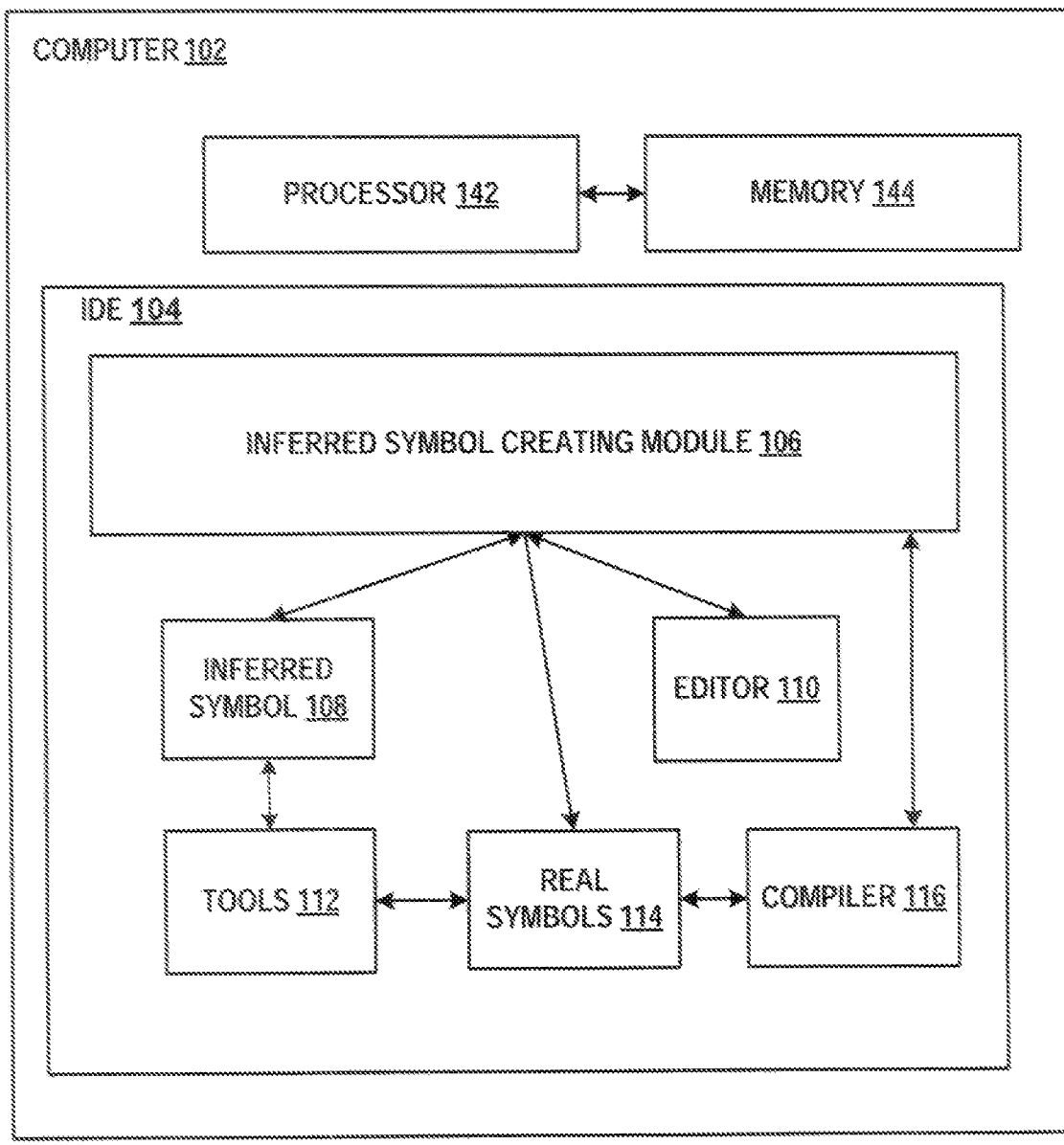
FIG. 1a illustrates an example of a system 100 for creating inferred symbols from code usage in accordance with aspects of the subject matter disclosed herein.

Test-driven development practices are increasing in popularity. Dynamic language influences in programming languages are becoming more prominent. Thus, it would be helpful if software development tools could provide information concerning potential code when a code model does not yet exist or is not yet known, but is still consumed. The subject matter described herein makes it possible to create tools for consume-first styles of programming that provide relevant information before symbols exist or before symbols are bound.

The subject matter disclosed herein applies in particular to writing code with a consume-first or test-first style of development and to writing dynamic (late-bound) code, although it will be appreciated that the subject matter disclosed herein is applicable to any style of computer program development. When writing code, a syntax tree, semantic tree or symbol table can be created that represents, is based on or is associated with the source code. For symbols that are not yet bound or defined in the global symbol table, a potential or "inferred" node or symbol can be created and can be added to the syntax tree, semantic tree or symbol table created by a compiler.

Multiple candidates for the symbol type may be possible for the inferred symbol (e.g., the symbol may represent a class or may represent a struct, the symbol may represent a method or may represent a property). All candidates can be represented in the tree/table as potential symbols, or alternatively, a service or software module can be provided to retrieve the candidate set. As the user continues writing code, the code model can be updated to represent the additional information based on a learning model (e.g., using machine learning techniques, as known in the art). For instance, if ambiguity exists concerning what a particular inferred symbol represents, as the developer continues writing code, the ambiguity may resolve or a particular choice among a collection of choices may become more likely. In this case the inferred symbol in the syntax tree, semantic tree or symbol table can be updated to represent the current state of knowledge.

The inferred symbols can be used by software development tools including but not limited to: completion list, call hierarchy, reference list, object browsers, class views, find references, navigation tools and so on to provide developer help for symbols that are not yet created or are not yet bound. In accordance with some aspects of the subject matter disclosed herein, inferred symbols can be visually distinguished by a difference such as color, highlighting, by accompaniment by a particular icon, etc.). Inferred symbols can be included or become visible within traditional integrated development environments by activating a particular mode (e.g., by activating a "suggestion mode" option). Based on the inferred symbol, error conditions discovered by the compiler may trigger the automatic generation of additional source code to correct the error condition. Inferred symbols may be converted to actual symbols by, for example, activation of an option to "make it real" or "generate from usage". For example, an inferred node may be converted to a concrete node in a syntax tree or semantic tree by activation of such an option. Similarly an inferred symbol in a symbol table may be converted to a concrete symbol by activation of such an option for the symbol table.

Creating Inferred Symbols from Code Usage

FIG. 1a illustrates an example of a system 100 for creating inferred symbols from code usage in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. Alternatively, system 100 or portions thereof may be provided as a standalone system or as a plug-in or add-in.

System 100 may include one or more of: a processor (such as processor 142), a memory such as memory 144, and a module for creating inferred symbols from code usage 106. Other components well known in the arts may also be included but are not here shown. It will be appreciated that the module for creating inferred symbols from code usage 106 can be loaded into memory 144 to cause one or more processors such as processor 142 to perform the actions attributed to the module for creating inferred symbols from code usage 106.

A data structure created or generated by a background compiler based on entered source code can be modified by the module for creating inferred symbols from code usage 106 to include an inferred symbol created by the module for creating inferred symbols from code usage 106. The inferred symbol may represent consumed code wherein consuming code is present in the source code when the consumed code is not present in the source code. The module for creating inferred symbols from code usage 106, in accordance with aspects of the subject matter disclosed herein, may create one or more inferred symbols 108 based on consuming code entered in an editor 110.

Editor 110 may represent a source code editor associated with a background compiler 116 that generates a syntax tree, semantic tree or symbol table of real symbols as a user enters source code. The module for creating inferred symbols from code usage 106, in accordance with aspects of the subject matter disclosed herein, may add or modify one or more inferred symbols 108 to the syntax tree, semantic tree or symbol table of real symbols created by compiler 116 based on code entered in an editor 110. Moreover, the module for creating inferred symbols from code usage 106 may generate source code based on the inferred symbol(s) as described more fully below. Tools 112 that operate over real symbols 114 may be set to operate in addition or instead on inferred symbols 108.

The module for creating inferred symbols from code usage 106 may include or be incorporated within one or more of the following: a compiler such as a background compiler, a parallel compiler or an incremental compiler, a parser such as a background parser, parallel parser or incremental parser or a plug-in, a pre-processor, or an add-in or extension to an IDE, parser, compiler or pre-processor. The module for creating inferred symbols from code usage 106 may be separate from or be associated with a compiler such as a background compiler, a parallel compiler or an incremental compiler, a parser such as a background parser, parallel parser or incremental parser or a plug-in, a pre-processor, or an add-in or extension to an IDE, parser, compiler or pre-processor. The module for creating inferred symbols from code usage 106 may be associated with, incorporated within or separate from program development tools including but not limited to completion list, call hierarchy, reference list, object browsers, class views, find references, and/or navigation tools. The module for creating inferred symbols from code usage 106 may convert one or more inferred symbols to real symbols in a symbol table, syntax tree or semantic tree.

An editor 110 may be a source code editor backed by a background compiler that generates semantic and/or syntax trees while the developer or user is writing source code. Suppose for example, a user writes the following:

```
public class Engine{
}
public class Bar {
    public void Foo( ) {
        Engine e = new Engine( );
        e.Start( );
    }
}
```

Figure 1B:
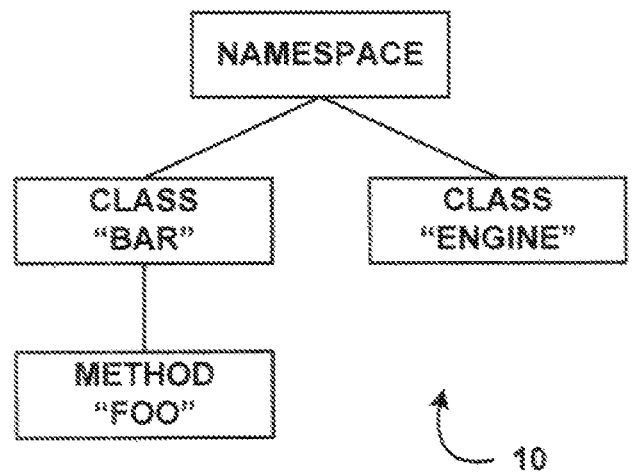
FIG. 1b illustrates an example of a tree 10 as is known in the prior art.

A background compiler as known in the art may generate a syntax tree 10 as illustrated in FIG. 1b as the developer inputs the code into the source code editor (e.g., editor 110 of FIG. 1a). The syntax tree 10 is an example of a data structure of real symbols as shown in FIG. 1a, real symbols 114. The syntax tree created by the background compiler includes the node for the class Bar and the node for the class Engine in response to the declarations of these classes by the lines:

```
public class Bar { ...}
and
public class Engine{
}
respectively.
```

Figure 1C:
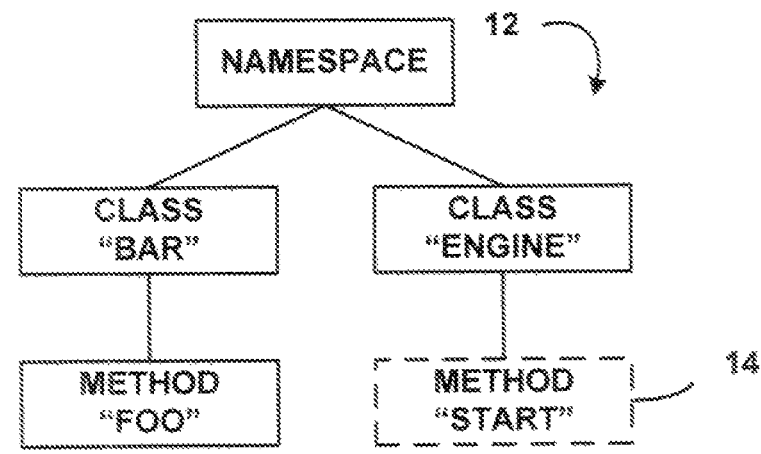
FIG. 1c illustrates an example of a tree 12 in accordance with aspects of the subject matter disclosed herein.

In accordance with aspects of the subject matter disclosed herein, the module for creating inferred symbols from code usage 106 creates the inferred node for the method "Start". When the module for creating inferred symbols from code usage 106 detects the statement:
  e. Start( );
the module for creating inferred symbols from code usage 106 deduces that a declaration for method start is needed. Referring now to FIG. 1c, the module for creating inferred symbols from code usage 106 creates an inferred node, node 14 for the method start in tree 12. The inferred nature of the node is depicted in FIG. 1c by the dashed lines of node 14. Once the inferred node has been added to the syntax tree, the inferred node can be used by tools 112 including but not limited to completion list, call hierarchy, reference list, object browsers, class views, find references, and/or navigation tools.

For example, once the inferred node has been added to the syntax tree, if the developer were to type "e." in his code, one of the options presented to him by an automatic completion tool could be "Start". Moreover, once the inferred node has been added to the syntax tree, the inferred node can be made a permanent part of the syntax tree by activating a "make it real" or "generate from usage" option available from tools such as but not limited to tools that associate information and actions with typed information (e.g., action tags). In response to making an inferred node real, source code may be generated according to a set of heuristics. For example, in response to making the method Start node real, the following source code may be generated:

```
public void Start( ){
}
```

An activation option may be provided in the programming environment that allows inferred nodes to be made visible or to be referenced in the available tools.

The inferred symbol created by the module for creating inferred symbols from code usage 106 may be created based on application of a set of rules, as described more fully below with respect to FIG. 2.

Figure 2:
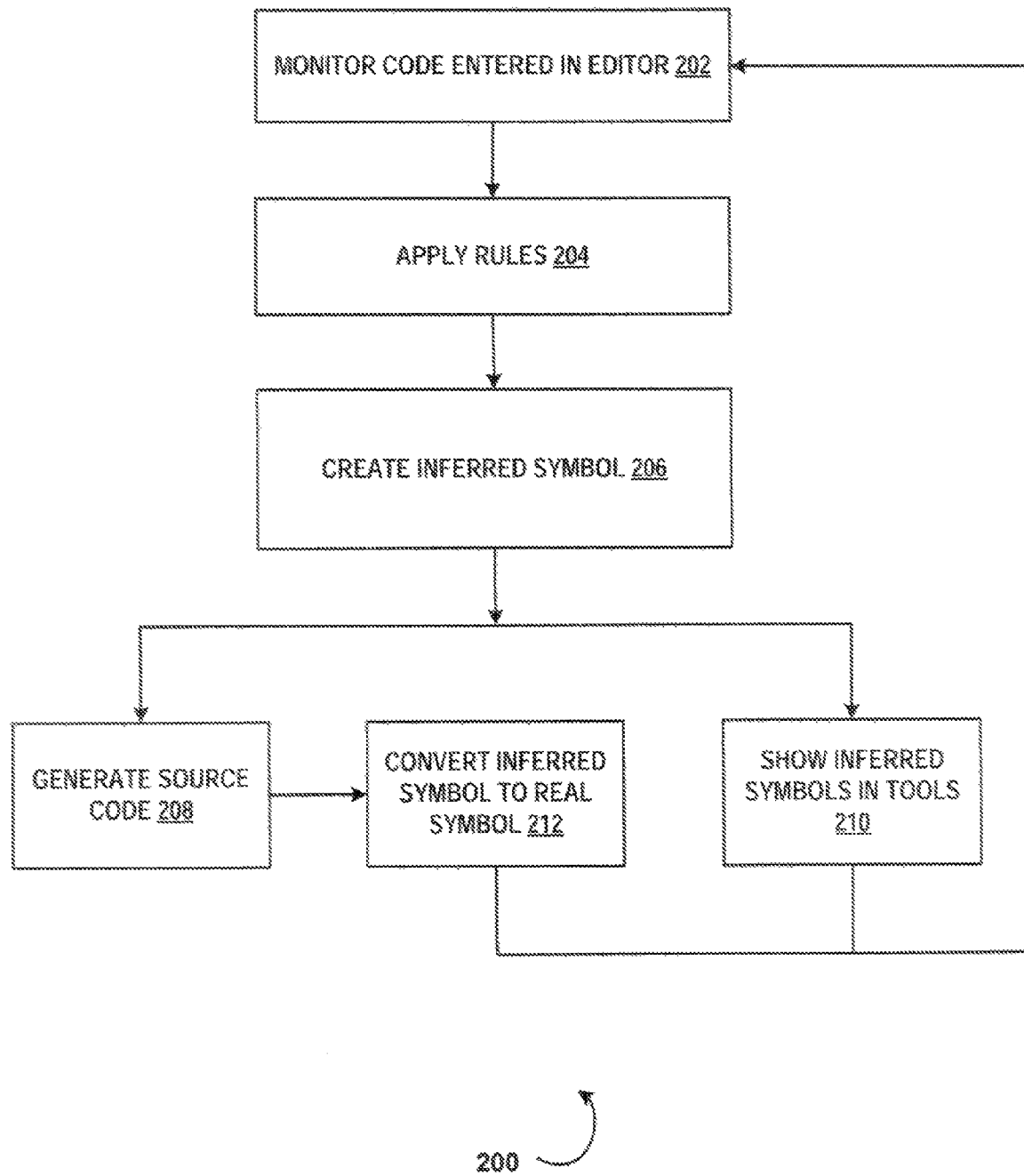
FIG. 2 is a flow diagram of an example of a method 200 for creating inferred symbols from code usage in accordance with aspects of the subject matter disclosed herein.

FIG. 2 illustrates an example of a method 200 for building inferred syntax trees from code usage in accordance with aspects of the subject matter disclosed herein. At 202 the module for creating inferred symbols from code usage monitors code entered in a source code editor which is backed by a background compiler. In response to detecting consumption code for which the code to be consumed is missing, the module for creating inferred symbols from code usage applies provided heuristics at 204 to create one or more inferred symbols at 206. The inferred symbols created include inferred symbols added to a symbol table, inferred nodes added to a syntax tree or inferred nodes added to a semantic tree.

Heuristics may include a set of defaults. For example, in a case in which a symbol could represent a class, an interface or a struct is part of it, a rule or rules may provide a mechanism for deciding what type of symbol the inferred symbol represents. For a symbol representing a method having different sets of parameters, a rule may determine if the parameters for the methods are to be unified into a small set of overloads of a single type or into a broader set of overloads of multiple types or anywhere in between. For example, if, using the example above, a parameter of 3 is passed to the method e.Start, it may be determined that the method Start takes an integer parameter. If, elsewhere in the source code a string is passed to e.Start, it may be determined that there are two methods called Start, one that takes strings and one that takes integers. A heuristic may be set up to determine that inferred symbols are generated by default with minimum access (e.g., "private") or with public access. With respect to determining if an inferred symbol is a class or an interface, it may be able to determine by the surrounding language that a particular inferred symbol is an interface or a class. For example, the statement:
  Engine e=new Engine( );
identifies engine as a class rather than an interface because this statement creates a new constructor for the class engine and it is known that interfaces cannot be constructed directly.

Once the inferred symbol has been added to the data structure (e.g., syntax tree, semantic tree or symbol table,) various options are available to the user. For example, selection of one option (e.g., a "make it real" or "generate from usage" option) may trigger automatic compiler-generated insertion of source code into the source program at 208 and conversion of the inferred symbol to a real symbol at 212. The compiler-generated code may represent consumed code including for example, a definition of a previously undefined symbol (e.g., generation of a method declaration, class declaration and so on, such as interfaces, events, and structs. Selection of another option may cause software development tools to show inferred symbols at 210 in software development tools such as but not limited to completion list, call hierarchy, reference list, object browsers, class views, find references, and/or navigation tools. Compiler-generated code may be displayed as "preview" code. In such event, the concrete symbols may be created temporarily. In response to a user action confirming the action, the temporary concrete symbols can become permanent. Alternatively, in response to a user action abandoning the code, the temporary concrete symbols can be discarded. It will be appreciated that when the term "compiler" and "compiler-generated" is used above, the module for creating inferred symbols from code usage may contribute to the compiler-generated code, be incorporated within or invoked by the compiler, as described above with respect to FIG. 1a, etc.

Example of a Suitable Computing Environment

Figure 3:
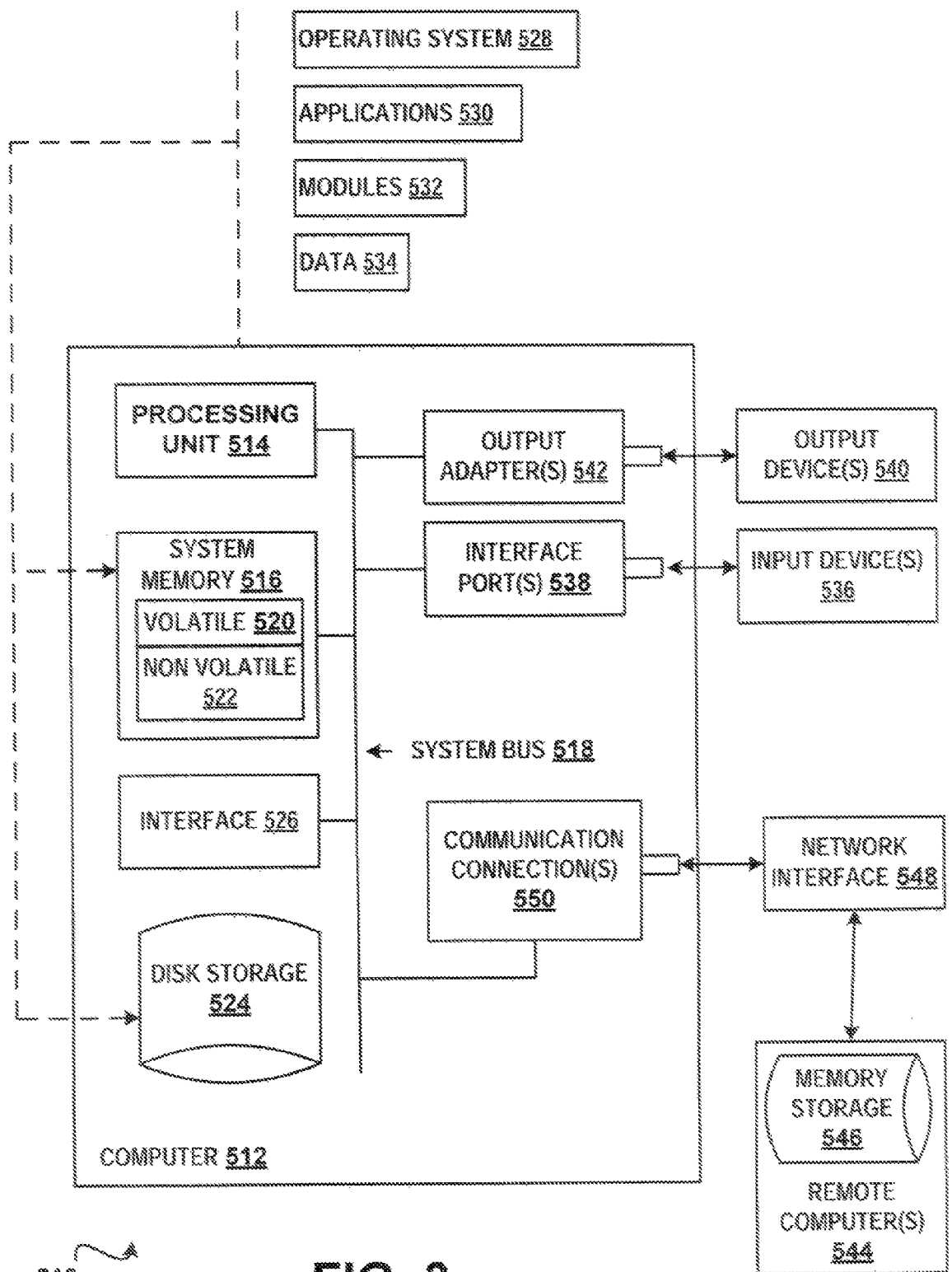
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for creating inferred symbols from code usage in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
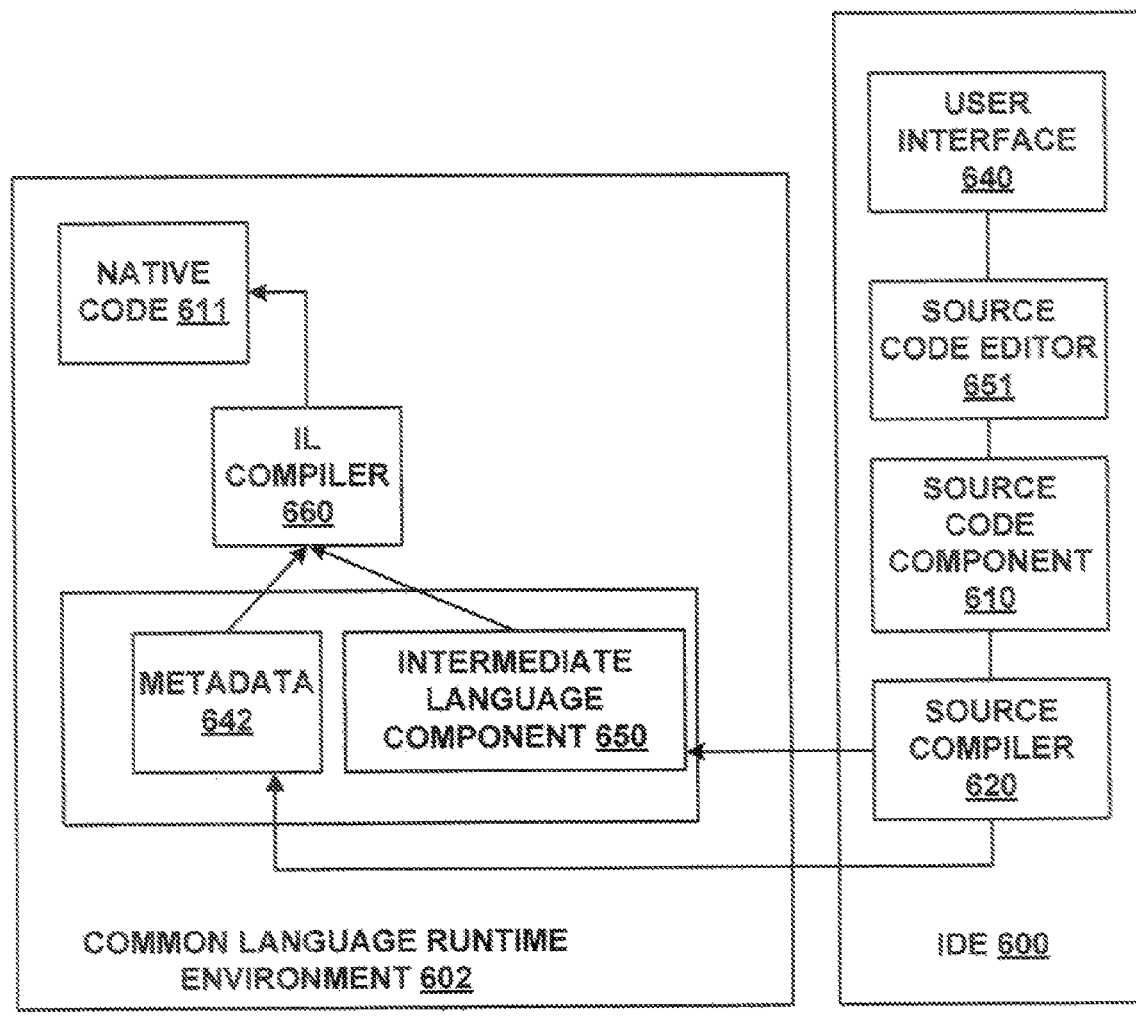
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework.

An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms.

Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
    a processor and a memory including a module configured to cause the processor to during program development:
    create a data structure including at least one inferred symbol generated by the module, wherein the at least one inferred symbol is created based on consuming code present in source code entered into a source code editor during the program development, the at least one inferred symbol representing code consumed by the consuming code wherein the consumed code is not present in the source code;
    utilize the at least one inferred symbol in a tool that is part of the source code editor, wherein the tool displays the inferred symbol for the user's use in developing source code; and
    convert the inferred symbol into a real symbol in the data structure based on receiving user input indicating to perform the conversion.

2. The system of claim 1, wherein the inferred symbol includes an object, method, function, variable, name, structure, property, or member.

3. The system of claim 1, wherein the data structure is a symbol table, syntax tree, or a semantic tree.

4. The system of claim 1, wherein conversion of the at least one inferred symbol to a real symbol triggers automatic compiler-generated addition of source code defining the at least one inferred symbol, wherein the source code defining the at least one inferred symbol is added to the source code entered into the source code editor.

5. The system of claim 1, wherein a software development tool in the programming environment displays developer help information associated with the at least one inferred symbol during program development.

6. The system of claim 5, wherein the software development tool displays the information associated with the at least one inferred symbol in response to user selection of an option to display the information associated with the at least one inferred symbol.

7. The system of claim 1, wherein the programming environment is a test-driven development environment or a dynamic programming environment.

8. A method comprising:
    creating a data structure of real symbols representing source code generated by a background compiler during interactive program development in a programming environment, wherein a module executing on a computer adds at least one inferred symbol to the data structure during the interactive program development, wherein the at least one inferred symbol is based on source code entered in a source code editor wherein the at least one inferred symbol is inferred from the source code based on usage in the source code of an undefined symbol;
    during the interactive program development, utilizing the at least one inferred symbol in a tool that is part of the source code editor, wherein the tool displays the inferred symbol for the user's use in developing source code; and
    during the interactive program development, converting the inferred symbol into a real symbol in the data structure based on receiving user input indicating to perform the conversion.

9. The method of claim 8, wherein the data structure is a syntax tree, a semantic tree or a symbol table.

10. The method of claim 8, further comprising:
    in response to activation of an option in the programming environment, displaying information associated with the at least one inferred symbol in software development tools in the programming environment.

11. The method of claim 8, wherein the programming environment for creating the source code comprises a test-driven development environment.

12. The method of claim 8, wherein the programming environment for creating the source code comprises a dynamic programming development environment.

13. The method of claim 8,
    wherein compiler-generated code is added to the source code defining the undefined symbol.

14. The method of claim 8, further comprising:
    wherein conversion of the at least one inferred symbol to a real symbol triggers automatic compiler-generated addition of source code defining the at least one inferred symbol, wherein the source code defining the at least one inferred symbol is added to the source code in the source code editor.

15. A device, comprising:
    at least one processor and a memory; the at least one processor configured to:
    during program development, create a data structure representing source code, the data structure generated by a background compiler, wherein at least one inferred symbol is added to the data structure based on source code entered in a source code editor wherein the at least one inferred symbol is inferred from the source code based on usage of a symbol without prior definition of the symbol;

during program development, utilizing the at least one inferred symbol in a tool that is part of the source code editor, wherein the tool displays the inferred symbol for the user's use in developing source code; and during program development, convert the at least one inferred symbol to a real symbol in the data structure response to receiving an indication from a user to convert the at least one inferred symbol to the real symbol.

16. The device of claim 15, wherein the at least one processor is further configured to:

create the at least one inferred symbol based on application of a set of rules to an undefined symbol.

17. The device of claim 15, wherein the at least one processor is further configured to:

automatically add compiler-generated code defining the at least one inferred symbol to the source code based on the at least one inferred symbol.

18. The device of claim 15, wherein the at least one processor is further configured to:

display information associated with the at least one inferred symbol in software development tools in response to activation of an option in a programming environment.

19. The device of claim 15, wherein the at least one processor is further configured to:

create a data structure comprising a semantic or syntax tree comprising at least one inferred node.

20. The device of claim 15, wherein the at least one processor is further configured to:

create a data structure comprising a symbol table comprising at least one inferred symbol.

* * * * *